United States Patent
Jeong

(10) Patent No.: US 7,415,090 B2
(45) Date of Patent: Aug. 19, 2008

(54) METHOD AND DEVICE FOR LOOP TIMING RECOVERY BASED ON MAXIMUM CONSTELLATION SIGNAL

(75) Inventor: Jun-young Jeong, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 705 days.

(21) Appl. No.: 11/043,470

(22) Filed: Jan. 26, 2005

(65) Prior Publication Data

US 2005/0169394 A1    Aug. 4, 2005

(30) Foreign Application Priority Data

Feb. 2, 2004   (KR)   ................... 10-2004-0006596

(51) Int. Cl.
*H04L 7/00*   (2006.01)
*H04L 27/06*  (2006.01)

(52) U.S. Cl. ...................... 375/355; 375/340

(58) Field of Classification Search ................ 375/316, 375/261, 326, 355, 222, 260, 371–376; 329/304, 329/306; 327/50, 58, 62, 141, 69, 71, 155–159, 327/91–95
See application file for complete search history.

(56) References Cited

U.S. PATENT DOCUMENTS 4,771,438 A * 9/1988 Nash .......................... 375/235
5,471,508 A * 11/1995 Koslov ........................ 375/344
6,137,839 A   10/2000 Mannering et al. .......... 375/260
6,891,792 B1 * 5/2005 Cimini et al. ................ 370/206
2004/0081205 A1 * 4/2004 Coulson ..................... 370/503

FOREIGN PATENT DOCUMENTS

KR    99-034147       5/1999
WO    WO 99/48219    9/1999

* cited by examiner

*Primary Examiner*—Tesfaldet Bocure
(74) *Attorney, Agent, or Firm*—Mills & Onello LLP

(57) ABSTRACT

A receiving device of a multiple communications channel system includes: a noise detector that detects channel noise among the received data signals and selects at least one channel among a plurality of channels in the multiple channel communications system on which the received data signals are largely unaffected by noise; a magnitude checker that selects at least one channel among the plurality of channels on which the received data signals have a magnitude greater than a predetermined magnitude among the received data; a QAM unit constellation detector that detects a QAM unit constellation using a reference constellation from a constellation value on a QAM coordinate plane of the selected signal channel; and a constellation rotation unit that rotates and maps the detected QAM unit constellation value onto a Real=Imaginary axis. The receiving device performs a reliable phased locked loop operation by eliminating the effect caused by noise during transmission of the data signals, while retaining phase error information in extracting the timing information from received data signals.

19 Claims, 8 Drawing Sheets

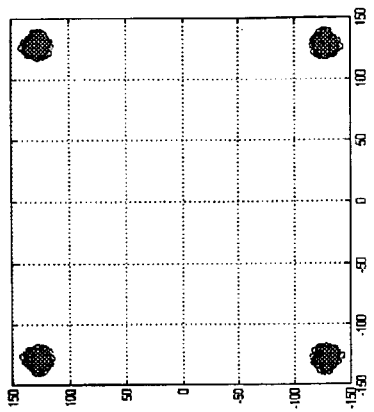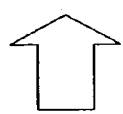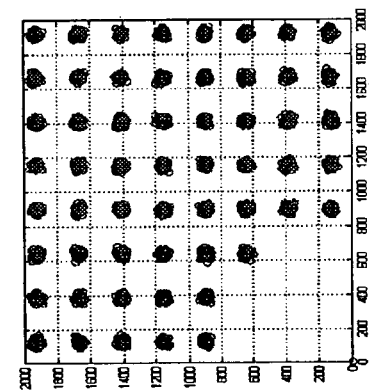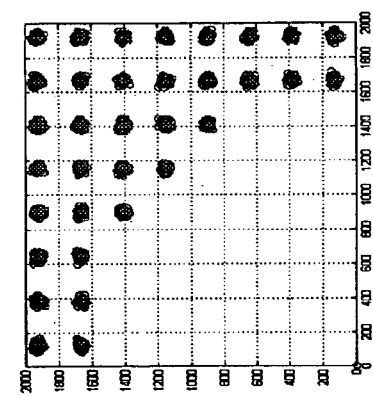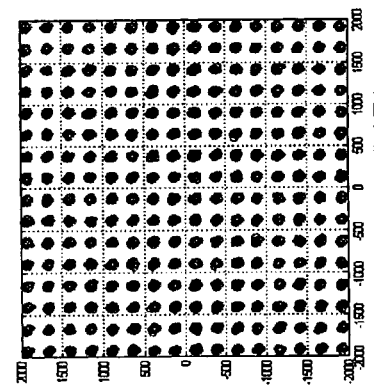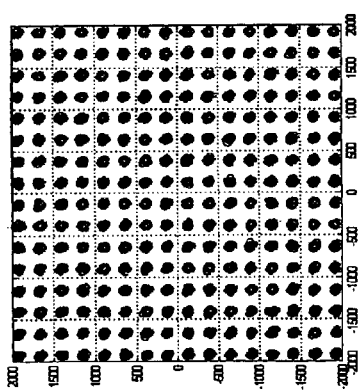
FIG. 12A
FIG. 12B

METHOD AND DEVICE FOR LOOP TIMING RECOVERY BASED ON MAXIMUM CONSTELLATION SIGNAL

This application claims the priority of Korean Patent Application No. 2004-6596, filed on Feb. 2, 2004, in the Korean Intellectual Property Office, the disclosure of which is incorporated herein in its entirety by reference.

BACKGROUND OF THE INVENTION

1. Field of the Invention

The present invention relates to multiple channel communication systems, and more particularly, to a device and a method for configuring a digital phase-locked loop (PLL) to recover loop timing of data received over multiple channel communication systems.

2. Description of the Related Art

Digital Subscriber Line (xDSL) technology refers to receiving and transmitting technology for data transmission between digital subscriber loop (DSL) modems. Generally, xDSL technology includes High-speed Digital Subscriber Lines (HDSLs), Symmetric High-speed Digital Subscriber Lines (SHDSLs), Asymmetric Digital Subscriber Lines (ADSLs), Splitterless ADSLs, and Very-high-speed Digital Subscriber Lines (VDSLs).

Multiple channel communication systems such as conventional xDSL have a master-slave configuration, and transmit a specific reference signal used for synchronization, from a central processing office, i.e., the master, to a user terminal, i.e., the slave. Usually, in multiple communication systems, loop timing for transmitting and receiving correct data between the user terminal and the central processing office has to be guaranteed. Typically, when the central processing office operates as the master and a reference signal having a specific frequency (or a particular channel specifically assigned for only a PLL operation, as distinguished from a data transmission channel) is output to the user terminal, the user terminal receives the reference signal and performs the PLL operation to extract the timing information from the received signal.

The performance of the PLL operation is very important in terms of performance and reliability of the overall system. Thus, an accurate PLL operation has to be carried out and the user terminal has to perform the PLL operation depending entirely on the received reference signal.

In a multiple channel environment, even if the same PLL is operated, its function differs with the channel environment of the communication system to which it is applied. This is because attenuation of the reference signal is present due to interference with other communications systems transferring signals on the same signal line, or due to channel noise. With lowered signal reliability of the received signal, inaccurate PLL operation in the receiving stage can result.

SUMMARY OF THE INVENTION

The present invention provides a circuit and a device which can achieve loop timing using signals of a data transmission channel rather than using a phase-locked loop (PLL) reference signal already defined in the communication systems standard to extract timing information.

The present invention also provides a circuit and a device for operating a PLL only based on those signals with symbols having a maximum magnitude (or a magnitude greater than a predetermined magnitude) are transmitted, to increase reliability of the PLL operation when the magnitude of transmission data changes for each symbol.

The present invention also provides a circuit and a device that standardizes an N-quadrature amplitude modulation (QAM) signal, for example, 256-QAM signal, into a 4-QAM signal for PLL operation when the magnitude and phase of QAM for each signal changes during data transmission.

According to an aspect of the present invention, there is provided a method of performing loop timing recovery of received data in a multiple channel communications system. At least one channel is selected among a plurality of channels in the multiple channel communications system on which the received data signals are largely unaffected by noise by detecting channel noise among the received data signals. At least one channel is selected among the plurality of channels on which the received data signals have a magnitude greater than a predetermined magnitude among the received data. The received data signals of the selected at least one channels are folded onto a $1^{st}$ quadrant of a quadrature amplitude modulation (QAM) coordinate plane. The folded received data signals of the selected at least one channels are folded and mapped onto a Real=Imaginary axis. The rotated received data signals are shifted to a reference constellation having predetermined value. The shifted received data signals are folded onto $2^{nd}$, $3^{rd}$, and $4^{th}$ quadrants of the QAM coordinate plane to coincide with a 4-QAM format.

In one embodiment, the rotating and mapping of the folded received data channels comprises: detecting a QAM unit constellation from the constellation value of the QAM coordinate plane using the reference constellation; calculating a rotation vector from the QAM unit constellation; and rotating the folded received data signals to the Real=Imaginary axis using the rotation vector.

In one embodiment, the QAM unit constellation is (M, N) when the constellation value of the QAM coordinate plane is expressed as (M×R+Nx, N×R+Ny) when the reference constellation is represented as (R, R) and a constellation change caused by noise is expressed as (Nx, Ny). The rotation vector is represented as (M+N)+(M−N)×j.

In one embodiment, the rotating of the folded received data signals rotates the folded received data signals of the selected at least one channel by multiplying the QAM constellation with the rotation vector. In one embodiment, the shifting of the rotated received data signals shifts the rotated received data signals by dividing the rotated mapped constellation into a predetermined value derived from the magnitude of the QAM constellation. In one embodiment, the loop timing recovery method further comprises: detecting a phase error from data signals on the QAM constellation and then performing digital phase-locked loop.

According to another aspect of the present invention, a data receiving device is provided that recovers loop timing of received data signals received on a multiple channel communications system device. A noise detector detects channel noise among the received data signals and selects at least one channel among a plurality of channels in the multiple channel communications system on which the received data signals are largely unaffected by noise. A magnitude checker selects at least one channel among the plurality of channels on which the received data signals have a magnitude greater than a predetermined magnitude among the received data. A QAM unit constellation detector detects a QAM unit constellation using a reference constellation from a constellation value on a QAM coordinate plane of the selected signal channel. A constellation rotation unit rotates and maps the detected QAM unit constellation value onto a Real=Imaginary axis.

In one embodiment, the magnitude checker maps the received data signals of the selected at least one channel onto a $1^{st}$ quadrant of the QAM coordinate plane.

In one embodiment, the constellation rotation unit calculates a rotation vector from the QAM unit constellation and rotates the received data signals of the at least one channel onto a Real=Imaginary axis using the rotation vector. The constellation rotation unit converts the received data signals of the at least one channel into a 4-QAM format by shifting the rotated received data signals of the rotated at least one channel to a reference constellation of predetermined value. The constellation rotation unit further unfolds the received data signals of the shifted at least one channel onto $2^{nd}$, $3^{rd}$, and $4^{th}$ quadrants of the QAM coordinate plane to coincide to the 4-QAM format.

In one embodiment, the QAM unit constellation detector detects the QAM unit constellation as (M, N) when a constellation value on the QAM coordinate plane is expressed as (M×R+Nx, N×R+Ny), wherein the reference constellation is represented as (R, R) and a constellation change caused by noise is expressed as (Nx, Ny). The constellation rotation unit detects the constellation value as (M+N)+(M−N)×j when a constellation value on the QAM coordinate plane is expressed as (M×R+Nx, N×R+Ny), wherein the reference constellation is represented as (R, R) and a constellation change caused by noise is expressed as (Nx, Ny).

In one embodiment, the constellation rotation unit rotates the received data signals of the selected at least one channel on the QAM constellation to the Real=Imaginary axis by multiplying the QAM constellation and the rotation vector.

In one embodiment, the constellation rotation unit shifts the received data signals of the rotated mapped constellation into the 4-QAM format by dividing it into a predetermined value calculated from a magnitude of the QAM constellation.

In one embodiment, the data receiving device further comprises: a digital phase-locked loop circuit that detects a phase error from the received data signals in the 4-QAM format. The digital phase-locked loop circuit comprises: a phase detector that detects a phase from the received data signals in the 4-QAM format; and a loop filter that filters unwanted signal components from signals output from the phase detector. The data receiving device further comprises: an analog-to-digital converter that converts analog received data signals into digital received data signals in response to a timing signal; a receiving filter unit that synchronizes the digital received data signals in a time domain; a serial-to-parallel converter that converts the digital received data signals from serial data signals to parallel data channels; a Fourier transformer that fast Fourier transforms the parallel data channels; a digital-to-analog converter that converts the phase error signal output by the digital phase-locked loop circuit into an analog phase error signal; and a voltage controlled oscillator that changes a frequency of the timing signal in response to the analog phase error signal.

BRIEF DESCRIPTION OF THE DRAWINGS

The above and other features and advantages of the present invention will become more apparent by describing in detail exemplary embodiments thereof with reference to the attached drawings in which:

FIGS. 12A and 12B illustrate the results of converting 256-QAM data of the received signal into 4-QAM data for PLL operation according to the selected signal magnitude filter.

DETAILED DESCRIPTION OF THE INVENTION

Figure 1:
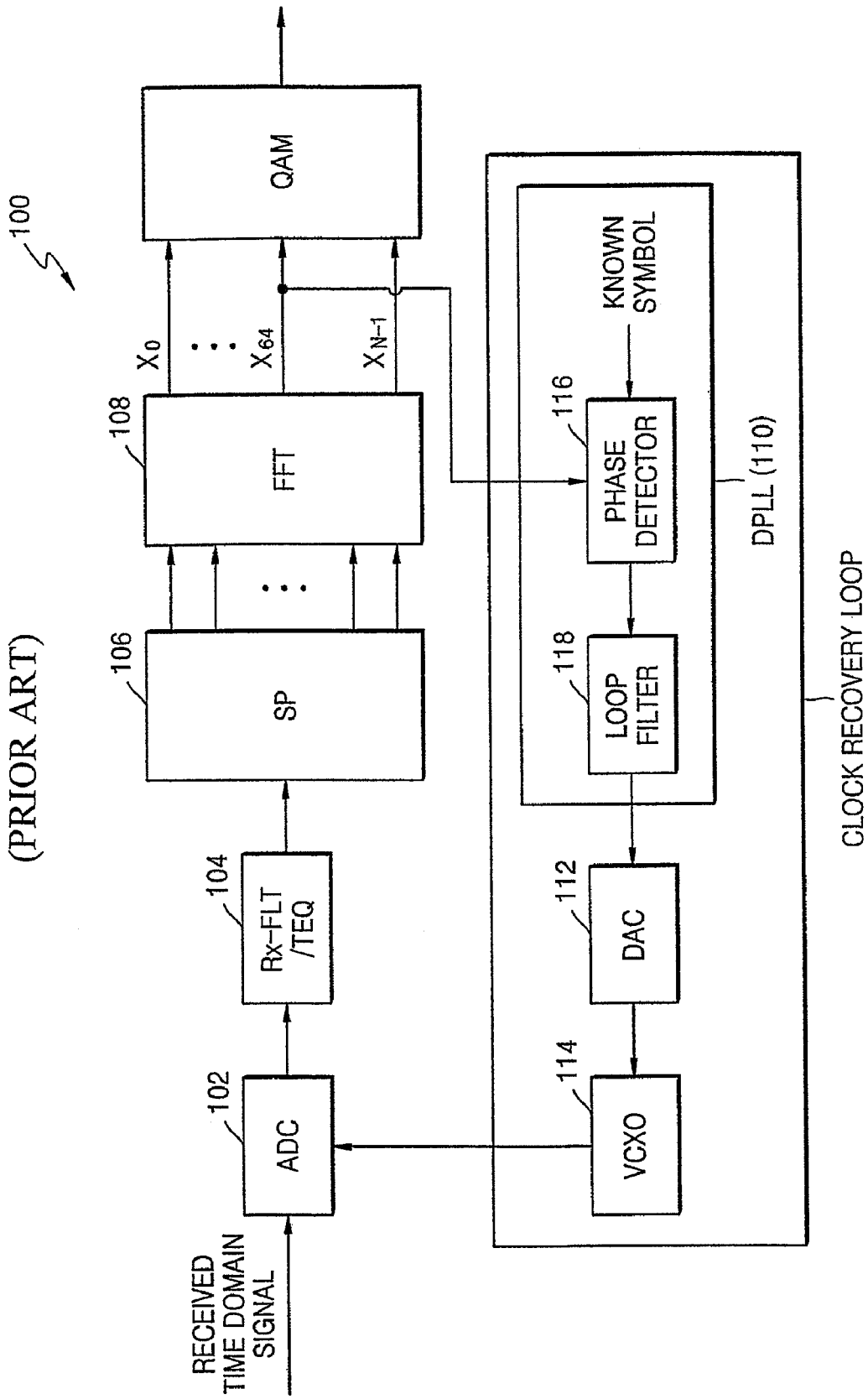
FIG. 1 is a block diagram of a receiving device of a wire digital communications system with a conventional phase-locked loop (PLL)

The attached drawings for illustrating exemplary embodiments of the present invention are referred to in order to gain a sufficient understanding of the present invention, the merits thereof, and the objectives accomplished by the implementation of the present invention. Hereinafter, the present invention will be described in detail by explaining exemplary embodiments of the invention with reference to the attached drawings. Like reference numerals in the drawings denote like elements.

In the present invention, a phase-locked loop (PLL) operates in response to reliable receiving channels at which transferred signals are received that have undergone relatively little signal attenuation. Reference signals having lower reliance for operating the PLL are eliminated. In this manner, in the present invention, a channel with relatively low interference is selected among data transmission channels, and the PLL operates using the selected channel. This is compared to the operation of a conventional system in which the channel selected for PLL operation is unable to perform data transmission, thereby lowering data transmission quantity, and when it is affected by noise, there is a problem in the reliability of the transferred data.

In the method of the present invention, data is transmitted via the selected channel and the PLL operation is used to extract timing information of the transmitted data based on a quadrature amplitude modulation (QAM) constellation of the received data. A separate PLL channel is not required and the PLL is conveniently and selectively operated according to the magnitude of signals after comparing the magnitude of each signal because the PLL is operated based on QAM data signals. That is, by detecting when a central processing office transmits a signal having a strength that is greater than a certain standard (the stronger the signal, the less that signal is affected by noise) and the PLL is operated based on that signal. Superior recovery of the timing signal is achieved in a reliable manner, as compared to that achieved according to the conventional method.

FIG. 1 is a block diagram of a receiving device 100 of a wired digital communications system with a conventional PLL. Referring to FIG. 1, the receiving device 100 of the wired digital communications system includes an analog-to-digital converter (ADC) 102, a receive filter (Rx-FLT/TEQ) 104, a serial-to-parallel converter (SP) 106, a Fourier transformer (FFT) 108, a digital PLL (DPLL) 110, a digital-to-analog converter (DAC) 112, and a voltage controlled oscillator (VCXO) 114. The DPLL 110 includes a phase detector 116 and a loop filter 118.

Referring to FIG. 1, the receiving device 100 operates the DPLL 110 using a predetermined signal (e.g. pilot tone $X_{64}$) and generates a sampling clock for analog-to-digital conversion. The clock recovery loop includes a pilot tone ($X_{64}$), the phase detector 116, the loop filter 118, the voltage controlled oscillator 114, and so on.

The ADC 102 is synchronized by a sampling clock controlled by the voltage controlled oscillator 114 and transforms a received time domain signal (or data) from an analog signal into a digital signal. The receive filter 104 equalizes the digital signal output by the ADC 102 in the time domain. The serial-to-parallel converter 106 receives data output by the receive filter 104 and converts the data output from the receive filter 104, i.e., serial data, into N parallel data using N switches (not shown). The Fourier transformer 108 Fourier transforms time domain data output by the serial-to-parallel converter 106 into frequency domain data. The DPLL 110 compares the phase of the $64^{th}$ sub-channel ($X_{64}$) and the phase of an already known symbol using the $64^{th}$ sub-channel ($X_{64}$) among N channels output by the Fourier transformer 108, and synchronizes the phase of the known symbol to the phase of the $64^{th}$ sub-channel ($X_{64}$).

In the case of an Asymmetric Digital Subscriber Line (ADSL), as an example of the wired digital multiple channel communications system, a central processing office that operates as a master transmits a predetermined signal (1+j) to a slave using a $64^{th}$ sub-channel of downstream data, i.e., a pilot tone ($X_{64}$) with a frequency of 276 kHz. Here, it is required that the sampling frequency of the receiving terminal is an integral multiple of the frequency of the pilot tone to maintain continuity between discrete multi-tone (DMT) symbols. Generally, the pilot tone has a constant phase.

The phase detector 116 receives only a predetermined channel for the PLL among channels output from the Fourier transformer 108 and extracts a digital phase error, i.e., the difference between the phase of a predetermined pilot signal (known signal) and the phase of an actually received signal $X_{64}$. It is assumed that a QAM constellation of the predetermined signal is ($X_{ref}, Y_{ref}$) and that of the received signal $X_{64}$ is ($X_r, Y_r$), and that the phase detector 116 detects a phase error which can be expressed as $\sin^{-1}(Y_{ref}X_r - X_{ref}Y_r) \approx X_r - Y_r$.

The loop filter 118 receives the phase error output from the phase detector 116, filters unwanted signal noise, and outputs a control voltage for controlling the voltage controlled oscillator 114 based on the phase error. A parameter value of the loop filter 118 is optimized in consideration of acquisition time and tracking error.

The digital-to-analog converter 112 converts the phase error output by the DPLL 110 into an analog signal and outputs the analog signal to the voltage controlled oscillator 114. The voltage controlled oscillator 114 responds to an analog voltage signal output by the digital-to-analog converter 112 and generates a sampling clock corresponding to the voltage signal to control the analog-to-digital converter 102.

A prerequisite to utilization of the previously mentioned conventional method is that the master of the two communication terminals must always transmit over a particular channel a constellation of a predetermined signal ($X_{ref}, Y_{ref}$) in advance and the receiving end must recover the predetermined signal into a signal of a channel compensated ($X_r, Y_r$) constellation. In view of this, one or more channel(s) among N channels is/are not used in the transmission of data and is/are allotted for operating only the PLL. A more serious problem occurs when transmission line noise exists within an selected channel for operating the PLL, or when there is interference from an adjacent wire communications system within the same line, as these can cause an increasing probability of the occurrence of error due to low signal transmission reliability since noise is included in the received signal.

Figure 2:
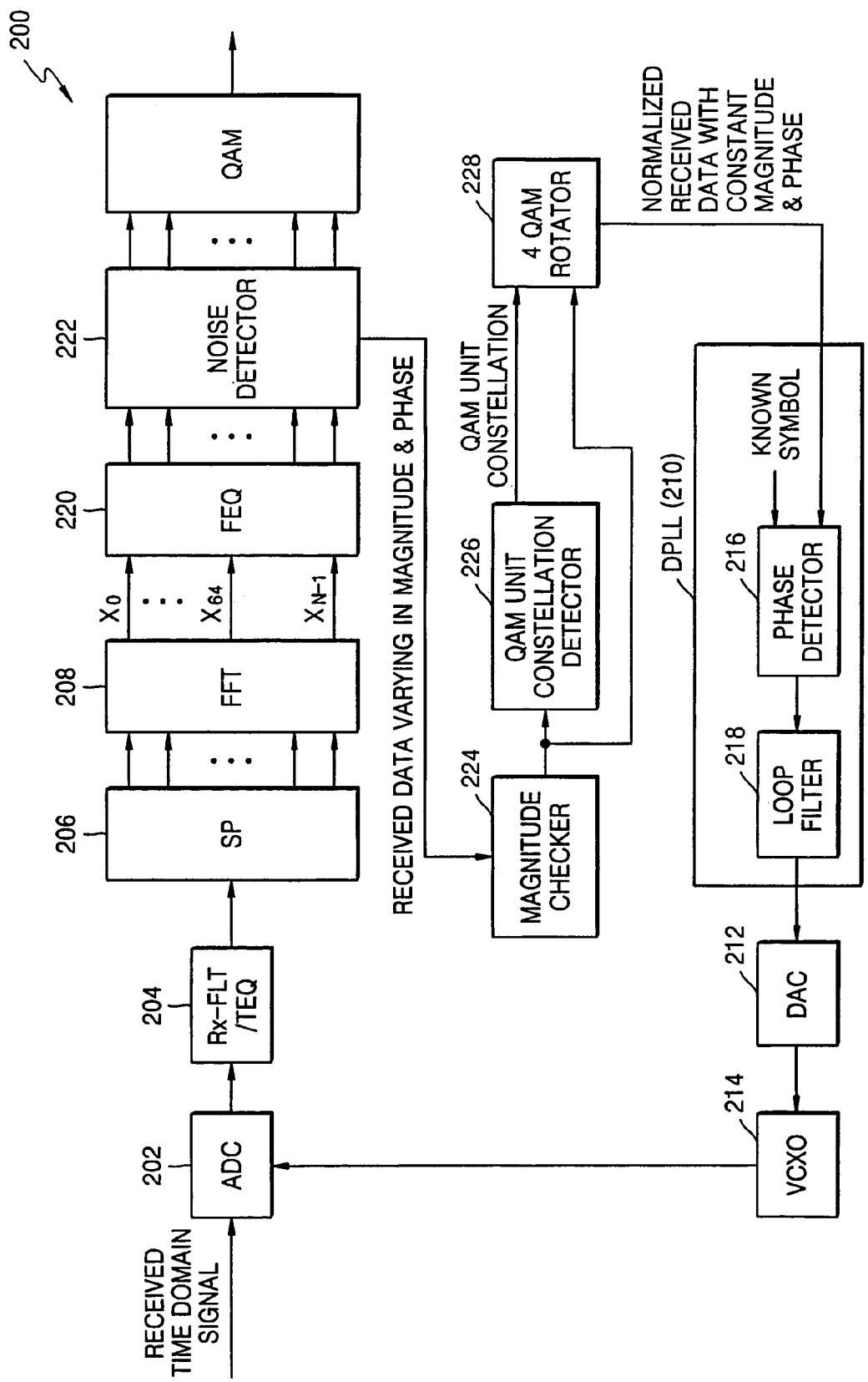
FIG. 2 is a block diagram of a receiving device of a wire digital communications system with a PLL according to an embodiment of the present invention.

FIG. 2 is a block diagram of a receiving device 200 of a wired digital communications system including a PLL according to an embodiment of the present invention. Referring to FIG. 2, the receiving device 200 of the wired digital communications system includes an analog-to-digital converter (ADC) 202, a receive filter (Rx-FLT/TEQ) 204, a serial-to-parallel converter (SP) 206, a Fourier transformer (FFT) 208, a digital PLL (DPLL) 210, a digital-to-analog converter (DAC) 212, and a voltage controlled oscillator (VCXO) 214, a frequency equalizer filter (FEQ) 220, a noise detector 222, a magnitude checker 224, a QAM unit constellation detector 226, and a 4-QAM rotator 228. The DPLL 210 includes a phase detector 216 and a loop filter 218.

The wired digital communications system of a PLL control method according to an embodiment of the present invention converts a QAM received data signal with a random magnitude into a 4-QAM signal having a reference magnitude. When a data signal is received as a 4-QAM signal, the PLL can be operated with a data channel, since phase error can be calculated with 45, 135, −45, and 135° of an orthogonal constellation as an axis.

The analog-to-digital converter 202, the receive filter 204, the serial-to-parallel converter 206, the Fourier transformer 208, the DPLL 210, the digital-to-analog converter 212, and the voltage controlled oscillator 214 of the receiving device 200 of the wire digital communications system according to the present embodiment of the present invention are identical to those of the receiving device 100 of FIG. 1.

The Fourier transformer 108 of the conventional approach of FIG. 1 selects a $64^{th}$ sub-channel ($X_{64}$) and outputs the sub-channel to a DPLL 110 for phase synchronizing. However, there is no such channel selection for the DPLL 210 among N channels output from the Fourier transformer 208 of the present invention as shown in FIG. 2, as no dedicated channel is required for timing recovery in the system and method of the present invention.

The frequency equalizer filter 220 receives each data channel output by the Fourier transformer 208 and corrects the phase and magnitude of channel data in the frequency domain for each tone, thereby compensating for errors in the received signals.

The noise detector 222 detects a base noise level of each sub-channel and interference signals of a line during a time period when there are no received signals. During signal transmission, the noise detector 222 detects channel noise by receiving the channel signals output from the Fourier transformer 208, selects those channels that are least affected by noise, and outputs the selected channels.

The magnitude checker 224 receives the selected signal channels output by the noise detector 222, detects the magnitude of the received signals, chooses only those channels with a magnitude greater than a predetermined magnitude to be used for operating the PLL, and outputs the chosen channels. The magnitude of the received signals changes for each symbol. Here, the reliability of the PLL operation correlates to the magnitude of the received signals. Therefore, the operation of the PLL can be performed selectively by selecting those signals with high magnitude to be used for timing information extraction.

The QAM unit constellation detector 226 receives the selected signals from the magnitude checker 224 and detects the received constellation value when noise is removed from a QAM constellation of the received signals. For example, when the received signal is received with a constellation value K=(M×R+N×R×i+Ns), the QAM unit constellation detector 226 detects a unit constellation (M, N) of the received signal from the constellation value K. Here, M×R denotes a signal, Ns denotes noise, and R denotes a constellation of a reference signal.

The 4-QAM rotator 228 receives the QAM unit constellation output from the QAM unit constellation detector 226 and the QAM constellation output from the magnitude checker 224. Then, the 4-QAM rotator 228 calculates an ideal QAM constellation value from the received signals, and moves, transfers, or maps the received signals to a reference location using the QAM constellation value.

Detailed functions of the magnitude checker 224, the QAM unit constellation detector 226, and the 4-QAM rotator 228 of FIG. 2 and a clock recovery loop will be described below.

Figure 3:
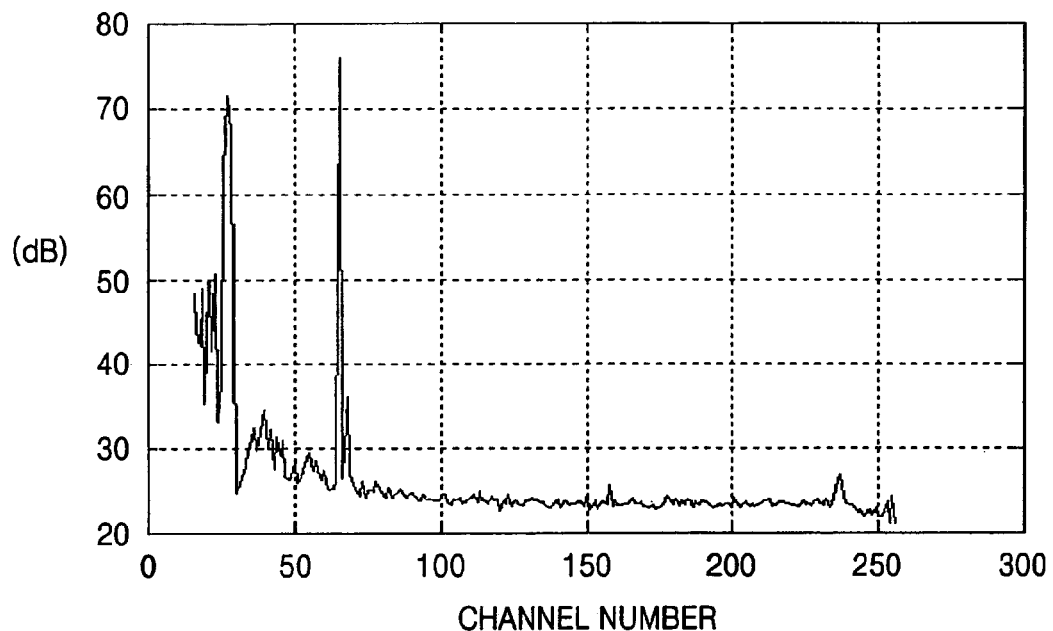
FIG. 3 is a graph of noise measurements.
Figure 4:
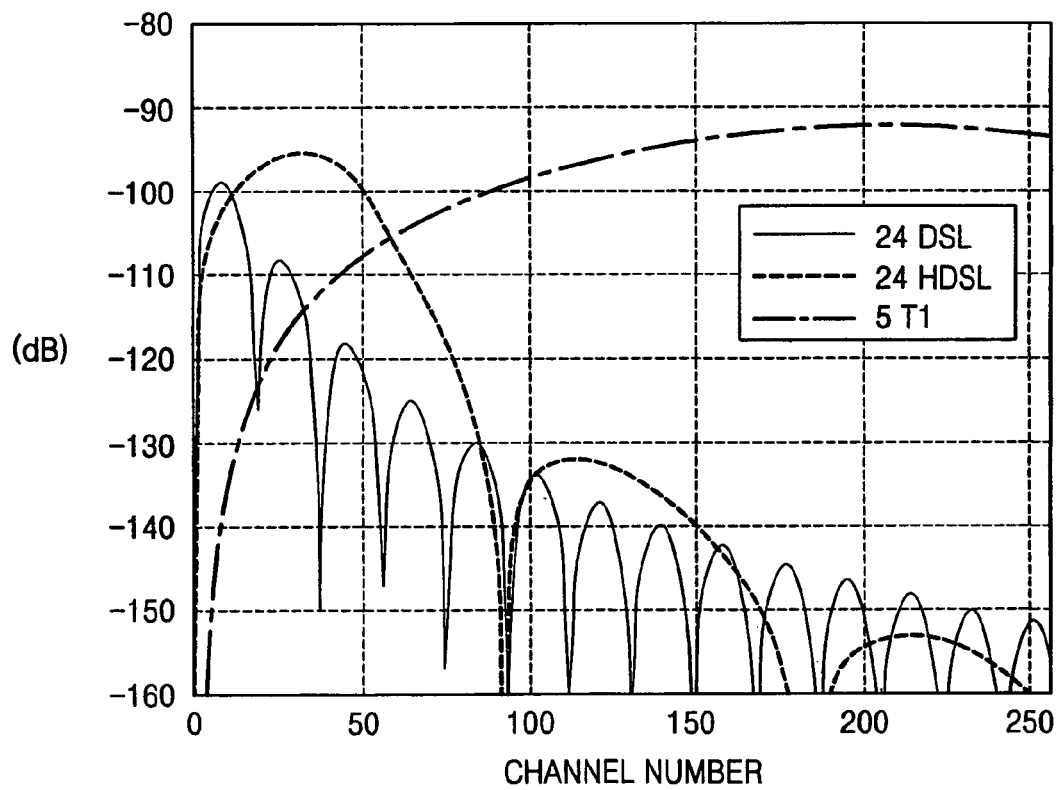
FIG. 4 is a graph of theoretical interference level according to types of adjacent communication systems.

FIG. 3 is a graph of noise measurements and FIG. 4 is a graph of theoretical interference levels according to the types of adjacent communication systems. Referring to FIG. 3, the X-axis denotes channel numbers of multiple channels. If it is assumed that the system is an ADSL communications system, the X-axis refers to a frequency of the channel number× 4.3125 kHz. The Y-axis denotes noise quantity in decibels (dB). The X-axis of FIG. 4 also denotes the channel number of multiple channels and the Y-axis denotes interference level according to an adjacent communications system in decibels (dB).

As the length of the transmission line between a central terminal office and a user communications terminal increases, the attenuation of signals transferred likewise increases, thereby lowering the reliability in the received signals due to a base noise (signal-to-noise ratio (SNR)). In addition, when a digital communications system that uses an identical frequency band shares the line, reliability of the signal transmission is lowered further due to interference caused by the other communications system. When a frequency channel prescribed to operate the PLL of the communications system exists in a frequency band with high base noise or high interference of the adjacent communications system, the reliability of the PLL likewise decreases. Therefore, there is a need to perform the PLL operation on signals transmitted to the frequency band with high reliability (or high signal-to-noise ratio (SNR)). In the receiving device 200 of the present embodiment of the present invention, channel noise is detected using the noise detector 222, a channel with the lowest noise/interference level is selected, and data received on the selected channel are forwarded to the QAM unit constellation detector 226.

Figure 5:
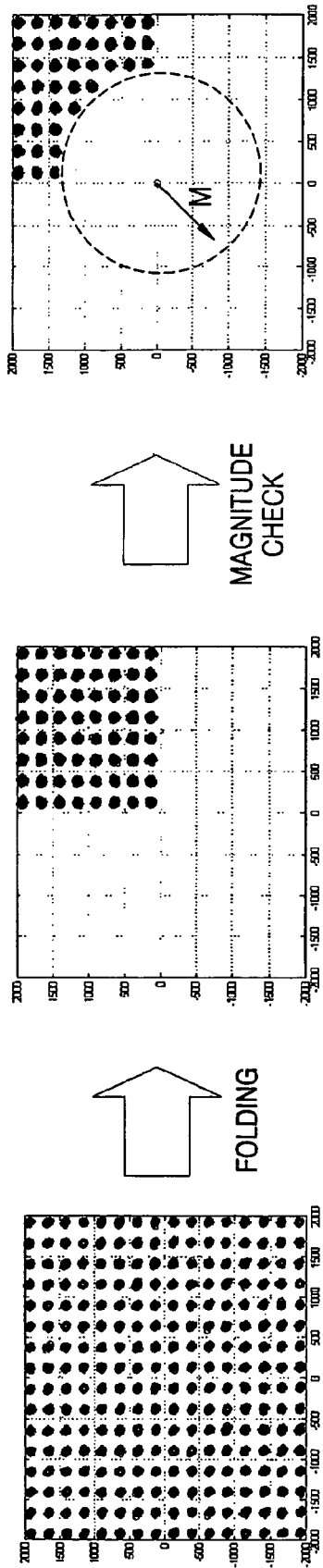
FIG. 5 illustrates the function of a magnitude checker according to an embodiment of the present invention.

FIG. 5 illustrates the operation of the magnitude checker 224 according to an embodiment of the present invention. A channel to be utilized for operating the PLL is determined by the noise detector 222. The selected channel is received in a K-QAM format (K=$2^b$, and "b" denotes the number of bits transmittable over the channel, e.g., if "b" is 8, "K-QAM" is 256-QAM). When the distance between each QAM cell is "R," a constellation of a received symbol can be shown as (M×R, N×R). The magnitude checker 224 checks the magnitude of the received signal and chooses only signals that have greater than a predetermined magnitude as channels to be used in operating the PLL. The magnitude of the received signal is in proportion to $M^2+N^2$, and since the magnitude of a signal is proportional to reliability, highly reliable operations can be conducted if the PLL operates using signals limited to those signals having greater than a predetermined magnitude.

The magnitude checker 224 further folds the received symbols mapped on the $2^{nd}$, $3^{rd}$, and $4^{th}$ quadrants of the coordinate axis onto the $1^{st}$ quadrant. Referring to FIG. 5, the magnitude checker 224 receives the channel that is selected by the noise detector 222 and folds the symbols of channels mapped on the $2^{nd}$, $3^{rd}$, and $4^{th}$ quadrants of the coordinate axis onto the $1^{st}$ quadrant. Then, only signals having a magnitude greater than the predetermined magnitude are filtered and output to the QAM unit constellation detector 226.

Figure 6:
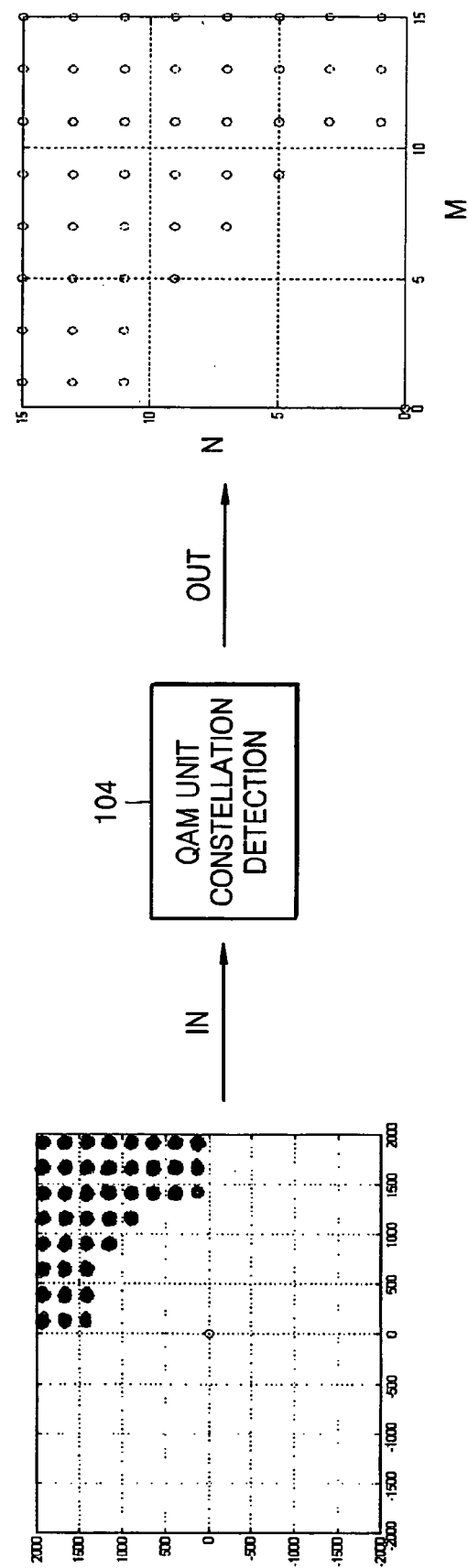
FIG. 6 illustrates a function of a quadrature amplitude modulation (QAM) unit constellation detector according to an embodiment of the present invention.

FIG. 6 illustrates the operation of the QAM unit constellation detector 226 according to an embodiment of the present invention. When the selected channel having the lowest amount of noise/interference is a data channel and not a prescribed channel for operating the PLL, the magnitude and phase of the received signal changes whenever symbols are transmitted. In other words, as the prerequisite of operating the conventional PLL, signals close to a reference signal ($X_{ref}, Y_{ref}$) should be received, but a data channel receives the signals at irregular locations according to a QAM magnitude in the data channel. Thus, a phase error cannot be detected based on received signals that are received at irregular locations. In contrast, the QAM unit constellation detector 226 according to the present invention matches, on a one on one basis, the constellation value of the received symbols mapped at the first quadrant to a unit constellation, thereby unifying the QAM magnitude of the data as shown in FIG. 6.

Figure 7:
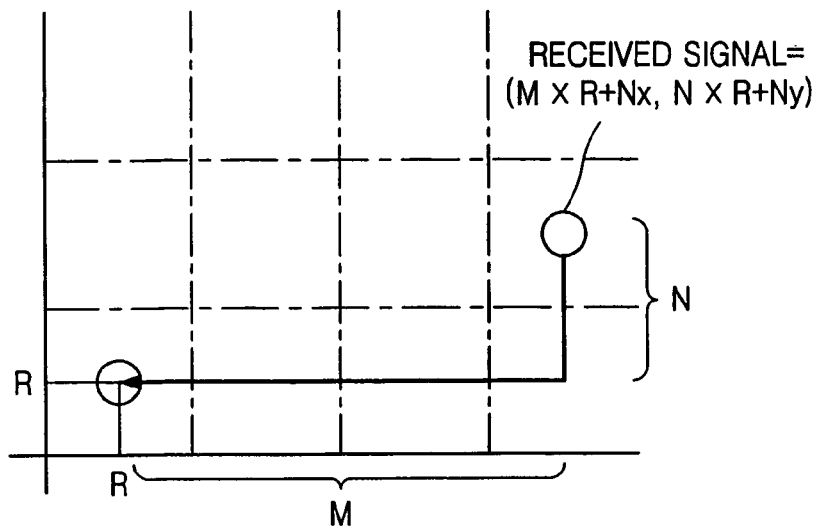
FIG. 7 is a view of the detection of a QAM unit constellation of a received signal, as detected by the QAM unit constellation detector according to an embodiment of the present invention.

FIG. 7 is a view of the detection a QAM unit constellation of the received signal, as detected by the QAM unit constellation detector 226 according to an embodiment of the present invention. The QAM unit constellation detector 226 detects a constellation value of the received signal and measures the distance between the constellation value of the received signal and the reference signal ($X_{ref}, Y_{ref}$). Referring to FIG. 7, when a reference signal is (R, R) and a received signal is (M×R+Nx, N×R+Ny) (here, (Nx, Ny) denotes a change in the constellation caused by noise), an output value of the QAM unit constellation detector 226 is (M, N). Since the noise components Nx and Ny are much less than the values of the signals M×R and N×R, the QAM unit constellation detector 226 can extract an (M, N) value which is a multiple of the reference signal. The extracted value (M, N) value is a QAM unit constellation with the noise removed from the received signal. In addition, the QAM unit constellation detector 226 detects the QAM unit constellation, rotates the received signal, and then outputs the detected constellation (M, N) value to the 4-QAM rotator 288.

Figure 8:
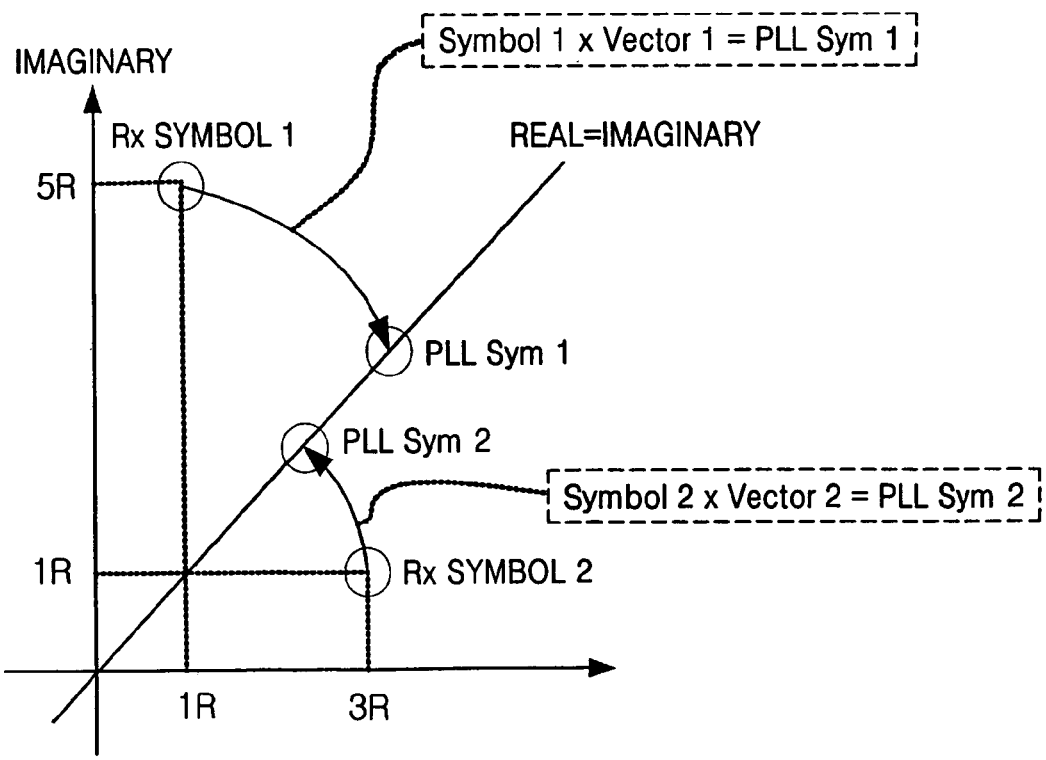
FIG. 8 is a graphical view of a function of a 4-QAM rotator according to an embodiment of the present invention.

FIG. 8 is a graphical view of a function of the 4-QAM rotator 288 according to an embodiment of the present invention. In order to perform PLL operations, the phase errors of the reference constellation value and the received signal are calculated. When a particular frequency channel is not wholly responsible for operating the PLL, i.e., when the PLL is operated using data that is received on a data channel as suggested by the present invention, the received signal is mapped to a predetermined location on the QAM constellation plane. The 4-QAM rotator 228 rotates the received signal mapped on the predetermined location on the QAM constellation plane so that the received signal is mapped onto the Real=Imaginary axis (i.e., the 45 degree axis between the real axis and the imaginary axis, as shown in FIG. 8). To do this, a vector value that maps the received signal at the QAM unit constellation to the Real=Imaginary axis is calculated. When the QAM unit constellation value is known, the vector value can be calculated using Equation 1 below:

$$V=(M+N)+(M-N)j \quad (1)$$

Vector V is a vector value that maps a unit center constellation of a QAM cell a received symbol belongs to (i.e., constellation received when the symbol is noise-free) onto the Real=Imaginary axis. When the received symbol is multiplied by the vector V, a phase error can be detected with the Real=Imaginary axis as the axis, regardless of the position where the received symbol is received on the QAM constellation.

FIG. 8 illustrates an example of mapping a received signal mapped onto a predetermined location of the QAM plane onto the Real=Imaginary axis. When the QAM unit constellation is detected through the QAM unit constellation detector 226, the vector V that maps the received signal onto the Real=Imaginary axis can be calculated using the Equation 1 above.

For example, when a received symbol (Symbol 1) is received on a QAM cell with (1R, 5R) as the center, a QAM unit constellation is 1+5j and a vector V (Vector 1) is V=6−4j. Therefore, a constellation of the received symbol (Symbol 1) to be mapped to (PLL Sym 1) is (1+5j)×(6−4j)=26+26j and thus, the received symbol (Symbol 1) is mapped onto the Real=Imaginary axis. In addition, when a received symbol (Symbol 2) is received on a QAM cell with (3R, 1R) as the center, a QAM unit constellation is 3+j and a vector V (Vector 2) is V=4+2j. Therefore, a constellation to which the received symbol (Symbol 2) is mapped to (PLL Sym 2) is (3+j)×(4+2j)=10+10j and thus, the received symbol (Symbol 2) is mapped onto the Real=Imaginary axis.

Figure 9:
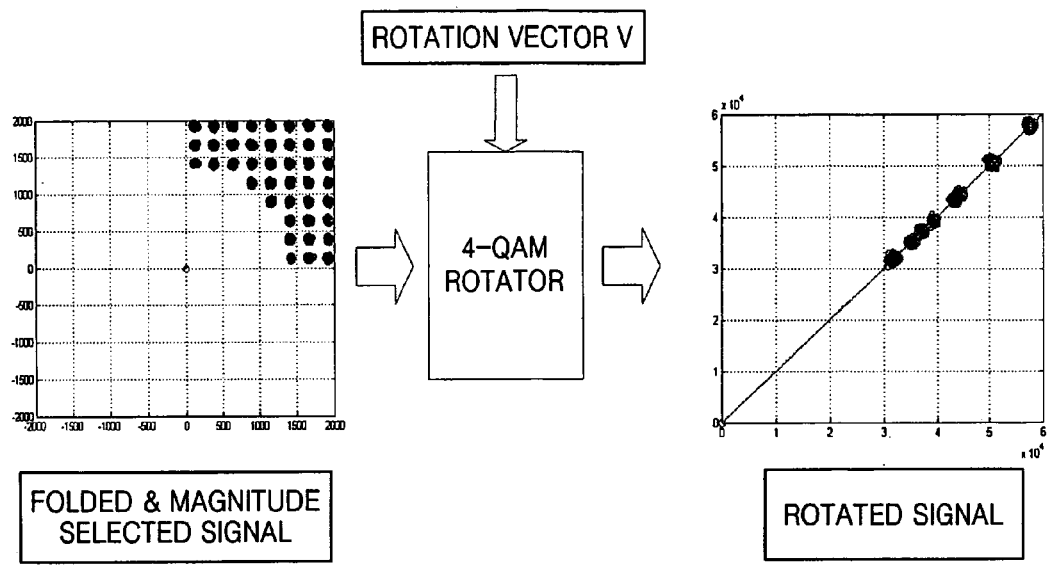
FIG. 9 illustrates an experimental example of a received symbol with a predetermined magnitude mapped onto a Real=Imaginary axis.

FIG. 9 illustrates an experimental example of a received symbol with a predetermined magnitude mapped onto the Real=Imaginary axis. The received signals mapped on the $2^{nd}$, $3^{rd}$, and $4^{th}$ quadrants by the magnitude checker 224 are folded onto the $1^{st}$ quadrant, and only those signals having greater than a predetermined magnitude are filtered by the magnitude checker 224. Then, signals filtered through the 4-QAM rotator 228 are mapped onto the Real=Imaginary axis. That is, only received data signals with no error and noise are mapped onto the 45° axis on the constellation plane using the receiving device 200 according to present invention.

Then, the received signals mapped onto the Real=Imaginary axis are shifted to a reference constellation and unfolded in a 4-QAM format according to Equation 2 below in which (R, R) is the reference constellation:

$$P = \frac{(X + Y \times j) \times V \times R}{(M^2 + N^2)}$$

If $X \times Y \rangle 0$ and $Y \langle 0$, Real $(P)$=−Real $(P)$, Image $(P)$=−Image $(P)$ If $X \times Y \langle 0$ and $Y \rangle 0$, Real $(P)$=−Real $(P)$ If $X \times Y \langle 0$ and $Y \langle 0$, Image $(P)$=−Image $(P)$ \quad (2)

Here, X+Y×j denotes an output signal for checking magnitude and the reference signal is shown as (R, R). In addition, V denotes a rotation vector and P denotes a PLL symbol with a 4-QAM format of the reference constellation of the received signal X+Y×j.

Figure 10:
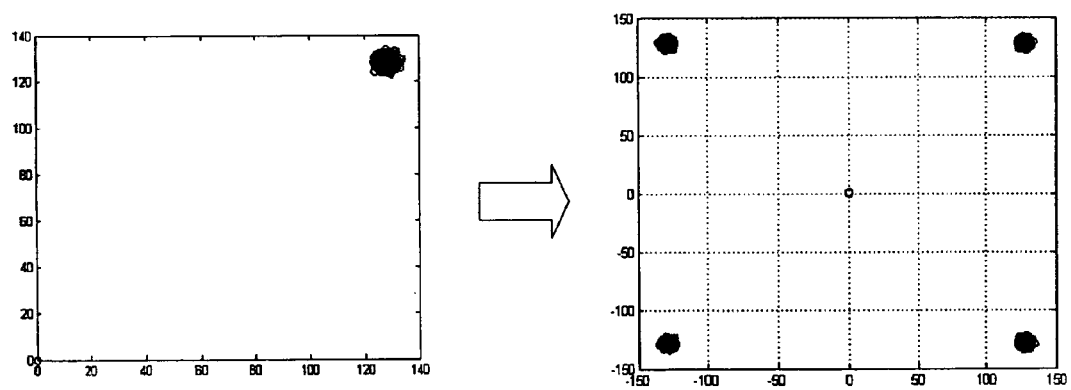
FIG. 10 is a graph of an example of the final output of the 4-QAM rotator unfolded in a 4-QAM format after the received symbols are moved to a reference constellation.

FIG. 10 is a graph of an example of the final output of the 4-QAM rotator 288 unfolded in a 4-QAM format after the received symbols are moved to a reference constellation.

Figure 11:
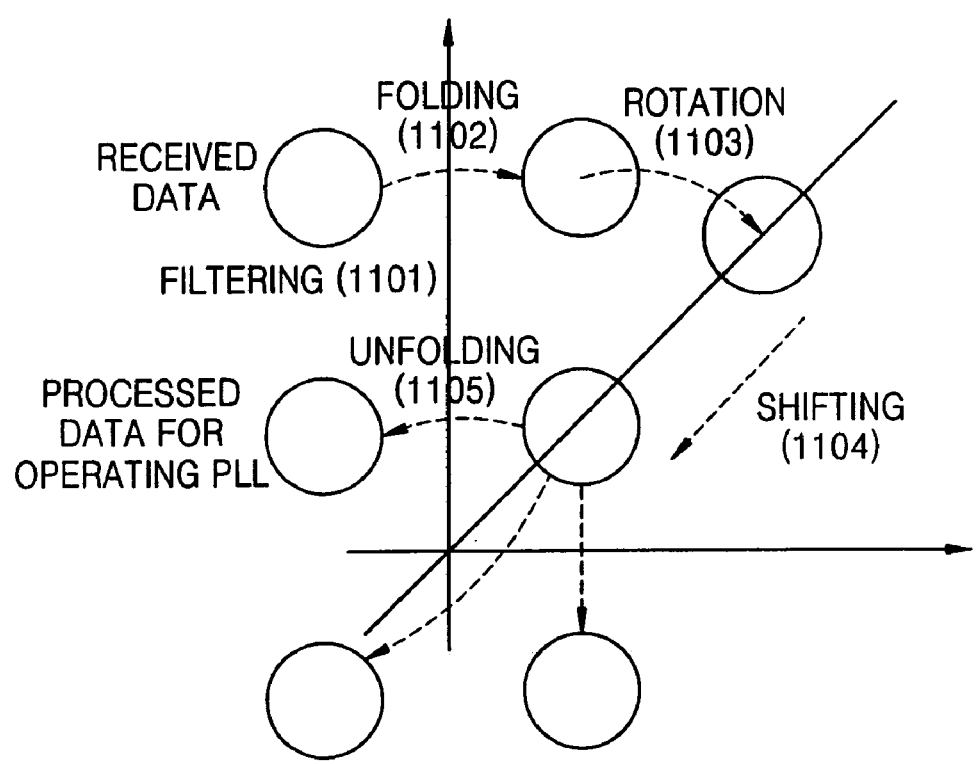
FIG. 11 is an illustration of the overall flow of the present invention.

FIG. 11 is an illustration of the overall flow of the present invention. Referring to FIG. 11, the received signals are filtered through the noise detector 222 and the magnitude checker 224 (Operation 1101) and folded on the $1^{st}$ quadrant of the QAM constellation plane (Operation 1102). Then, the received signals are rotated and mapped onto the Real=Imaginary axis by the vector V (Operation 1103). Next, the rotated received signals are shifted to a predetermined value which is a reference constellation (Operation 1104) and the constellation of the $1^{st}$ quadrant is unfolded onto the $2^{nd}$, $3^{rd}$, and $4^{th}$ quadrants to coincide with the 4-QAM format (Operation 1105). The PLL symbols in the 4-QAM format are output to the DPLL 210 to perform the PLL operation.

FIGS. 12A and 12B illustrate the results of converting the 256-QAM data of the received signal into 4-QAM data for the PLL operation according to the selected signal magnitude filter for signals of different magnitudes. FIG. 12A is the result of filtering received signals with a magnitude of over 800 and then converting the filtered signals into the 4-QAM format and FIG. 12B is the result of filtering received signals with magnitude over 1600 and then converting the filtered signals into the 4-QAM format. The SNR value of the data converted into the 4-QAM format to operate PLL increases as a predetermined magnitude increases. FIG. 12B shows that the magnitude of the noise cloud is decreased, as compared to the results of FIG. 12A. The noise cloud is decreased because the effect caused by the noise has decreased as the magnitude of the received signals are divided into magnitude of $M^2+N^2$. However, the error may remain even if the effect caused by noise decreases. In other words, a reliable PLL operation can be performed because the effect caused by the noise has been decreased and only the phase error remains.

According to a receiving device of a multiple channel communications system that embodies a PLL according to the present invention, loop timing may be achieved using data signals that are transmitted on a data transmission channel. In addition, the PLL can be operated is a manner so as to limit the operation to be based on only those received signals having symbols of the greatest magnitude (or greater than a predetermined magnitude), to thereby increase the reliability of the PLL operation. Furthermore, operation of the reliable PLL can be achieved without the effect caused by the noise by unifying N-QAM signals into 4-QAM signals.

While the present invention has been particularly shown and described with reference to exemplary embodiments thereof, it will be understood by those of ordinary skill in the art that various changes in form and details may be made herein without departing from the spirit and scope of the present invention as defined by the following claims.

What is claimed is:

1. A method of performing loop timing recovery of received data in a multiple channel communications system, the method comprising:

selecting at least one channel among a plurality of channels in the multiple channel communications system on which the received data signals are largely unaffected by noise by detecting channel noise among the received data signals;

selecting at least one channel among the plurality of channels on which the received data signals have a magnitude greater than a predetermined magnitude among the received data;

folding the received data signals of the selected at least one channels onto a $1^{st}$ quadrant of a quadrature amplitude modulation (QAM) coordinate plane;

rotating and mapping the folded received data signals of the selected at least one channels onto a Real=Imaginary axis;

shifting the rotated received data signals to a reference constellation having predetermined value; and unfolding the shifted received data signals onto $2^{nd}$, $3^{rd}$, and $4^{th}$ quadrants of the QAM coordinate plane to coincide with a 4-QAM format.

2. The method of claim 1, wherein the rotating and mapping of the folded received data channels comprises:

detecting a QAM unit constellation from the constellation value of the QAM coordinate plane using the reference constellation;

calculating a rotation vector from the QAM unit constellation; and rotating the folded received data signals to the Real=Imaginary axis using the rotation vector.

3. The method of claim 2, wherein the QAM unit constellation is (M, N) when the constellation value of the QAM coordinate plane is expressed as (M×R+Nx, N×R+Ny) when the reference constellation is represented as (R, R) and a constellation change caused by noise is expressed as (Nx, Ny).

4. The method of claim 3, wherein the rotation vector is represented as (M+N)+(M−N)×j.

5. The method of claim 2, wherein the rotating of the folded received data signals rotates the folded received data signals of the selected at least one channel by multiplying the QAM constellation with the rotation vector.

6. The method of claim 1, wherein the shifting of the rotated received data signals shifts the rotated received data signals by dividing the rotated mapped constellation into a predetermined value derived from the magnitude of the QAM constellation.

7. The method of claim 1, wherein the loop timing recovery method further comprises: detecting a phase error from data signals on the QAM constellation and then performing digital phase-locked loop.

8. A data receiving device that recovers loop timing of received data signals received on a multiple channel communications system device, the data receiving device comprising:

a noise detector that detects channel noise among the received data signals and selects at least one channel among a plurality of channels in the multiple channel communications system on which the received data signals are largely unaffected by noise;

a magnitude checker that selects at least one channel among the plurality of channels on which the received data signals have a magnitude greater than a predetermined magnitude among the received data;

a QAM unit constellation detector that detects a QAM unit constellation using a reference constellation from a constellation value on a QAM coordinate plane of the selected signal channel; and a constellation rotation unit that rotates and maps the detected QAM unit constellation value onto a Real=Imaginary axis.

9. The data receiving device of claim 8, wherein the magnitude checker maps the received data signals of the selected at least one channel onto a $1^{st}$ quadrant of the QAM coordinate plane.

10. The data receiving device of claim 8, wherein the constellation rotation unit calculates a rotation vector from the QAM unit constellation and rotates the received data signals of the at least one channel onto a Real=Imaginary axis using the rotation vector.

11. The data receiving device of claim 10, wherein the constellation rotation unit converts the received data signals of the at least one channel into a 4-QAM format by shifting the rotated received data signals of the rotated at least one channel to a reference constellation of predetermined value.

12. The data receiving device of claim 11, wherein the constellation rotation unit unfolds the received data signals of the shifted at least one channel onto $2^{nd}$, $3^{rd}$, and $4^{th}$ quadrants of the QAM coordinate plane to coincide to the 4-QAM format.

13. The data receiving device of claim 8, wherein the QAM unit constellation detector detects the QAM unit constellation as (M, N) when a constellation value on the QAM coordinate plane is expressed as (M×R+Nx, N×R+Ny), wherein the reference constellation is represented as (R, R) and a constellation change caused by noise is expressed as (Nx, Ny).

14. The data receiving device of claim 10, wherein the constellation rotation unit detects the constellation value as (M+N)+(M−N)×j when a constellation value on the QAM coordinate plane is expressed as (M×R+Nx, N×R+Ny), wherein the reference constellation is represented as (R, R) and a constellation change caused by noise is expressed as (Nx, Ny).

15. The data receiving device of claim 10, wherein the constellation rotation unit rotates the received data signals of the selected at least one channel on the QAM constellation to the Real=Imaginary axis by multiplying the QAM constellation and the rotation vector.

16. The data receiving device of claim 11, wherein the constellation rotation unit shifts the received data signals of the rotated mapped constellation into the 4-QAM format by dividing it into a predetermined value calculated from a magnitude of the QAM constellation.

17. The data receiving device of claim 8, wherein the data receiving device further comprises: a digital phase-locked loop circuit that detects a phase error from the received data signals in the 4-QAM format.

18. The data receiving device of claim 17, wherein the digital phase-locked loop circuit comprises:

a phase detector that detects a phase from the received data signals in the 4-QAM format; and a loop filter that filters unwanted signal components from signals output from the phase detector.

19. The data receiving device of claim 17, wherein the data receiving device further comprises:

an analog-to-digital converter that converts analog received data signals into digital received data signals in response to a timing signal;

a receiving filter unit that synchronizes the digital received data signals in a time domain;

a serial-to-parallel converter that converts the digital received data signals from serial data signals to parallel data channels;

a Fourier transformer that fast Fourier transforms the parallel data channels;

a digital-to-analog converter that converts the phase error signal output by the digital phase-locked loop circuit into an analog phase error signal; and a voltage controlled oscillator that changes a frequency of the timing signal in response to the analog phase error signal.

* * * * *